US008270436B2

(12) United States Patent
Huang et al.

(10) Patent No.: US 8,270,436 B2
(45) Date of Patent: Sep. 18, 2012

(54) DATA STRUCTURE BOUNDARY SYNCHRONIZATION BETWEEN A TRANSMITTER AND RECEIVER

(75) Inventors: Wensheng Huang, Cary, NC (US); Bogdan Sutkowski, Apex, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 934 days.

(21) Appl. No.: 11/856,898

(22) Filed: Sep. 18, 2007

(65) Prior Publication Data
US 2009/0074046 A1 Mar. 19, 2009

(51) Int. Cl.
H04J 3/16 (2006.01)
H04J 3/22 (2006.01)
(52) U.S. Cl. ...................................... 370/473
(58) Field of Classification Search .................. 370/473, 370/349, 394
See application file for complete search history.

(56) References Cited

U.S. PATENT DOCUMENTS

| 6,909,758 | B2 | 6/2005 | Ramesh et al. | |
|---|---|---|---|---|
| 6,937,564 | B2 | 8/2005 | Anttila | |
| 2001/0056560 | A1* | 12/2001 | Khan et al. | 714/746 |
| 2002/0071421 | A1* | 6/2002 | Chiu et al. | 370/349 |
| 2004/0032853 | A1* | 2/2004 | D'Amico et al. | 370/349 |
| 2004/0240423 | A1* | 12/2004 | Anttila | 370/349 |
| 2007/0097913 | A1 | 5/2007 | Hanov | |

FOREIGN PATENT DOCUMENTS

| WO | 2004/107082 A2 | 9/2004 |
|---|---|---|
| WO | 2007/051281 A1 | 5/2007 |

OTHER PUBLICATIONS

M.Analoui and M.H Rezvani, Performance Enhancement of Logical Link Control Using Channel Quality in GPRS, IEEE,2002, pp. 329-334.*
Analoui, M. et al. "Performance Enhancement of Logical Link Control using Channel Quality to GPRS." 2002 IEEE Asia-Pacific Conference on Circuits and Systems (APPCCAS '02), 2002, vol. 1, pp. 329-334.

* cited by examiner

Primary Examiner — Anh-Vu Ly
Assistant Examiner — Maharishi Khirodhar
(74) Attorney, Agent, or Firm — Coats & Bennett, P.L.L.C.

(57) ABSTRACT

Synchronization between a transmitter and a receiver with respect to the boundary of higher-layer logical data structures is improved by considering both the statistical likelihood of the value of a transmitted boundary indicator and the quality of the channel during the transmission. A boundary indicator received under poor channel quality, that is decoded to a statistically unlikely value, is suspect and one or more retransmission is requested. A reliable value of the boundary indicator is a retransmitted boundary indicator received during good channel conditions; the value of two boundary indicators received successively, both under poor channel conditions, that decode to the same value; or a majority vote of three successive boundary indicators, the first two received under poor channel conditions. The accuracy of the received boundary indicator is increased, at a cost of one, or at most, two, retransmissions.

19 Claims, 3 Drawing Sheets

FIG. 3

| RLC BLOCK | |
|---|---|
| RLC/MAC HEADER | RLC DATA BLOCK 1 | RLC DATA BLOCK 2 (CONDITIONAL) |

FIG. 4

| E | FBI | EGPRS RLC DATA |
|---|---|---|

FIG. 5

| ENTRY | BSN | 1ST DECODE | | 2ND DECODE | | 3RD DECODE | | DECISION |
|---|---|---|---|---|---|---|---|---|
| | | VALUE | QUALITY | VALUE | QUALITY | VALUE | QUALITY | |
| 1 | 8 | 1 | BAD | 1 | ---- | ---- | ---- | 1 |
| 2 | 13 | 1 | BAD | 0 | GOOD | ---- | ---- | 0 |
| 3 | 256 | 1 | BAD | 0 | BAD | X | ---- | X |
| ... | | | | | | | | |

DATA STRUCTURE BOUNDARY SYNCHRONIZATION BETWEEN A TRANSMITTER AND RECEIVER

FIELD OF THE INVENTION

The present invention relates generally to telecommunication systems, and in particular to an improved data structure boundary synchronization between a transmitter and receiver.

BACKGROUND

Modern telecommunication networks employ a layered architecture, such as the Open Systems Interconnection seven-layer reference model (OSI-7) or variations thereon, to deliver end-user data across diverse media (e.g., fiber optics, copper wire, radio air interface, and the like). The layered architecture, also known as a protocol stack, hides the low-level implementation details of the different media from high-level logical data structures, such as IP packets. As data are processed "down" the protocol stack at a transmitter, data from the higher-level logical data structures are packed into lower-level, typically smaller, data structures optimized for a particular transport medium. A header containing information necessary for processing the data at that protocol layer is attached, and the data may be further processed, such as error detection and correction encoding, encryption, and the like. This process is referred to as "encapsulation" of the data into the lower-level logical data structures.

Numerous lower-level logical data structures are transmitted across a channel to a receiver. The receiver relies on information in the headers for ordering the lower-level logical data structures, and performs processing such as error correction, decryption, and the like. When all the data in a higher-level logical structure are successfully received, the lower-level logical structure headers are discarded and the higher-level logical structure is re-assembled (referred to as "decapsulation") and passed "up" the protocol stack for further processing.

As mentioned, the higher-level logical data structures are typically larger—often dramatically so—than the lower-level logical data structures into which they are encapsulated. One way to preserve and transmit information about the boundaries of the higher-level logical structure is to define an indicator in each lower-level logical structure that indicates whether or not the lower-level logical structure includes a boundary of a higher-level logical structure. For example, a Boundary Indicator (BI) bit may be defined (the BI bit may or may not be considered part of the header). If the BI=1, the lower-level logical structure includes the end of a higher-level logical structure, and may include the beginning of a second higher-level data structure (or any additional space may be padded). If the BI=0, the lower-level logical structure is an intermediate one, and at least one successive lower-level logical structure will also include data for the same higher-level logical structure. Of course, numerous variations of this form of transmitter/receiver synchronization with respect to the boundaries of higher-level logical data structures are known.

If the Boundary Indicator is received erroneously, and the error is not detected, synchronization between the transmitter and receiver is lost. Using the above example, if BI=1 is transmitted to indicate the end of a higher-layer logical data structure but is received as BI=0, the receiver will wait for more lower-level logical data structures, and will not decapsulate and pass on the higher-level logical structure. The receiver may time-out, make explicit transmission requests for the "missing" data, or otherwise process the perceived error of not receiving further lower-level logical data structures. Conversely, if BI=0 is transmitted but received as BI=1, the receiver will prematurely decapsulate and pass on a higher-level logical structure that is incomplete. In this case, processing at a higher protocol layer will eventually discover the error, and will trigger a retransmission of part or all of the higher-level logical structure. In either case, the transmission is disrupted and some error-handling routine must reestablish higher-layer logical data structure boundary synchronization between the transmitter and receiver.

Accordingly, ensuring the correct receipt of the Boundary Indicator improves the efficiency of telecommunication networks. Several methods for accomplishing us are known in the art. For example, the BI may be protected by additional error correction coding (ECC). However, error correction coding operates by adding redundancy. This reduces efficiency by increasing the overall ratio of ECC bits to user data. As another example, the BI itself may be replicated. The probability of multiple-bit errors, coinciding with the duplicate BI bits, is statistically lower than the probability of a single-bit BI error. However, this also reduces efficiency by increasing the ratio of overhead (redundant BI) bits to user data.

SUMMARY

According to one or more embodiments disclosed and claimed herein, synchronization between a transmitter and a receiver with respect to the boundary of higher-layer logical data structures is improved by considering both the statistical likelihood of the value of a transmitted boundary indicator and the quality of the channel during the transmission. If the higher-layer logical structure is encapsulated into many lower-layer logical data structures, a negative boundary indicator is statistically more likely than a positive boundary indicator. A boundary indicator received under poor channel quality, that is decoded to a statistically unlikely value, is suspect and one or more retransmission is requested. A reliable value of the boundary indicator is a retransmitted boundary indicator received during good channel conditions; the value of two boundary indicators received successively, both under poor channel conditions, that decode to the same value; or a majority vote of three successive boundary indicators, the first two received under poor channel conditions. The accuracy of the received boundary indicator is increased, at a cost of one, or at most, two, retransmissions.

One embodiment relates to a method of deciding the value of a boundary indicator transmitted from a transmitter to a receiver across a channel having varying quality, the boundary indicator having a statistically likely value and a statistically unlikely value. A boundary indicator is received and decoded to obtain a first value. A channel quality metric is monitored. If the channel quality metric is below a predetermined threshold and the first value is the statistically unlikely value, an indication of the first value is stored and a retransmission of the boundary indicator is requested.

Another embodiment relates to a receiver. The receiver includes a receiver operative to receive a boundary indicator having a statistically likely value or a statistically unlikely value over a channel having varying quality, and further operative to decode the boundary indicator to obtain a first value. The receiver also includes a controller operative to control the receiver and further operative to monitor at least one channel quality metric. The receiver further includes memory operatively coupled to the controller. If a channel quality metric is below a predetermined threshold and the first value is the statistically unlikely value, the controller is further operative to store an indication of the first value and direct the receiver to request a retransmission of the boundary indicator.

BRIEF DESCRIPTION OF THE DRAWINGS

FIG. 3 is a block diagram of an RLC block.
FIG. 4 is a block diagram of the RLC block payload for EGPRS transmission.
FIG. 5 is a representative FBI Set Decision table.

DETAILED DESCRIPTION

Embodiments of the present invention are described herein in the context of an Enhanced General Packet Radio Services (EGPRS) system, to provide a concrete example. However, those of skill in the art will readily recognize that the present invention is not limited to EGPRS or any other system, and may be advantageously employed to improve logical structure boundary synchronization between a transmitter and a receiver, across any medium, at any protocol layer, in any telecommunication network.

EGPRS is a third generation (3G) digital wireless communication technology that provides increased data transmission rates and improved data transmission reliability over the GPRS standard. EGPRS is a digital, packet-switched service available to users of the Global System for Mobile Communications (GSM) wireless standard. EGPRS supports services such as Wireless Application Protocol (WAP) access, Short Message Service (SMS), Multimedia Messaging Service (MMS), Voice over IP (VoIP, also known as Push-to-Talk or PTT), Instant Messaging (IM), and Internet communication services such as email and World Wide Web (WWW) access.

Packet data transactions in EGPRS are performed by establishing a Temporary Block Flow (TBF) which transfers Logical Link Control (LLC) protocol layer Packet Data Units (PDUs) between a transmitter and a receiver. The LLC protocol is the lowest EGPRS protocol that is independent from the air interface protocols used. This makes the EGPRS core network design as independent as possible of the air interface. In this discussion, the TBF (comprising a sequence of LLC PDUs) is the higher-layer logical data structure to be transmitted.

Figure 1:
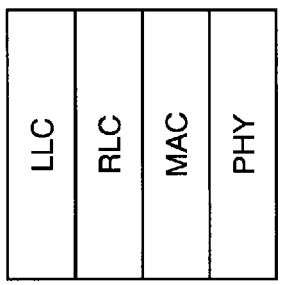
FIG. 1 is a network protocol layer block diagram.

FIG. 1 depicts the protocol stack structure below the LLC layer. It includes the Radio Link Control (RLC), Media Access Control (MAC), and Physical (PHY) layers. PHY is the physical link connecting the network nodes. In the case of EGPRS, this is the radio air interface. The MAC layer controls access of a device to a particular transmission medium—in this case, the air interface—performing tasks relating to access, sharing, and release of air interface resources such as traffic channels. The Radio Link Control protocol layer ensures data transmitted across a traffic channel are correctly received by applying an Automatic Repeat Request (ARQ) protocol in which the receiver requests retransmission of a data block if it detects an error. The data block, referred to herein as an RLC block, is a fixed-size data structure including a header and data field, or payload. In this discussion, the RLC block is the lower-level logical data structure. At a transmitter, the RLC layer encapsulates each LLC PDU into successive RLC block payloads for transmission. The RLC layer at a receiver decapsulates the RLC blocks and reassembles the LLC PDUs, which form a TBF.

Figure 2:
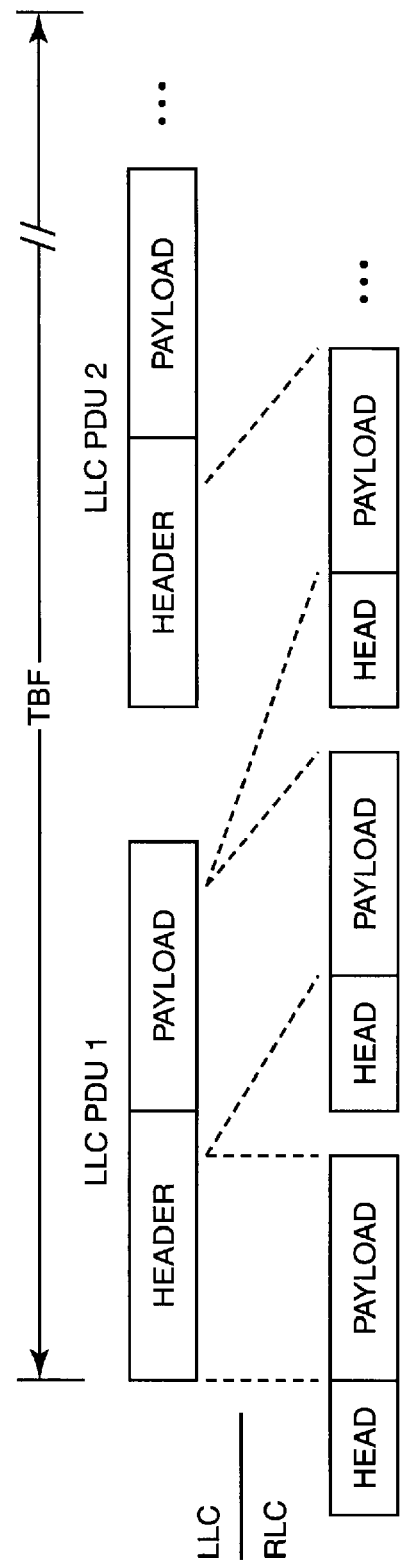
FIG. 2 is a diagram depicting encapsulation of LLC PDUs into RLC blocks.

The RLC layer encapsulation is depicted diagrammatically in FIG. 2. Segmentation of LLC PDUs and encapsulation into RLC blocks is supported to allow transport of LLC PDUs larger than the payload of a single RLC block. If the contents of a LLC PDU do not fill an integer number of RLC blocks, the beginning of the next LLC PDU is placed in the final RLC block of the first LLC PDU, with no padding or spacing between the end of the first LLC PDU and the beginning of the next LLC PDU. LLC PDUs in a TBF may have various lengths, and there may be a variable number of LLC PDUs in a TBF. If the final LLC PDU in the TBF does not fill an integer number of RLC blocks, the final markup block is padded with filler octets.

FIG. 3 depicts the structure of an RLC block. The payload of each RLC block contains octets from one or more LLC PDUs. The RLC block for EGPRS data transfer includes a combined RLC/MAC header, which includes a Block Sequence Number (BSN) to ensure that RLC blocks are reassembled at the receiver in the same order in which they were transmitted. The RLC block also includes one or two data blocks, depending on the modulation and coding scheme. Each RLC data block, depicted in FIG. 4, includes an Extension (E) bit and a Final Block Indicator (FBI) bit, followed by the EGPRS RLC data.

The network transmits EGPRS data by first establishing a Temporary Block Flow (TBF) between a transmitter and a receiver, and then successively transmitting the LLC PDUs (encapsulated into RLC blocks) that make up the TBF. The network indicates the termination of a TBF by sending an RLC data block with the FBI bit set to "1" (all RLC blocks in the TBF other than the final one have the FBI bit set to "0"). Incorrect decoding of the FBI bit at the receiver that goes undetected causes system errors. For example, if a FBI=0 is decoded as FBI=1, the receiver will tear down on the ongoing TBF, erroneously believing that the transmitter signaled the end of the TBF. Subsequent RLC blocks from the transmitter will be ignored, resulting in a failure of transmission for the TBF, which must be detected and remedied at a higher protocol level, eventually resulting in a retransmission. On the other hand, if a transmitted FBI=1 is decoded as FBI=0, the receiver will fail to recognize the intended termination of the TBF, and will not reassemble and pass along the last LLC PDU, awaiting further RLC blocks. This error will also be detected and remedied at a higher protocol level, such as via a time-out handling procedure, eventually resulting in a retransmission. In either case, the transmission is disrupted and air interface resources are wasted by needlessly retransmitting the entire TBF. Thus, it is obvious that the FBI bit should be well protected against a noisy channel. However, this is not always the case.

Referring again to FIG. 3, both the RLC header and the RLC data are $\frac{1}{3}$ convolutionally coded and protected with a Cyclic Redundancy Check (CRC), to increase the probability of correct decoding at the receiver RLC layer under poor channel quality conditions. One difference between the coding in the header and the payload is that the payload data is heavily punctured, a process that removes some of the redundant coded bits after encoding with an error-correction code. This results in the payload data being much less protected than the header. For example, in MCS-9, the convolution code rate is $\frac{1}{3}$; however, $\frac{2}{3}$ of all convolutionally encoded payload bits are punctured out after that, resulting in no coding gain at all. Since the FBI bit resides in the RLC payload, it is unprotected by convolutional coding, and all error detection depends on the 12-bit CRC.

The CRC has limited error detection capability. The CRC error detection capability depends on the binary polynomial used to calculate the CRC parity bits, the number of CRC parity bits, and the length of information bits. For a 12-bit CRC, the probability of an undetected error is $1/(2^{12})$, or 0.0244%. While this error probability is small, for MCS-9 with 4 downlink slots working in poor channel conditions, an undetected error could occur as often as once every 20.5 seconds (assuming no link adaptation).

In many applications, such as file transfer, streaming audio or video, and the like, the LLC PDUs are much larger than an RLC block, and a TBF may include many LLC PDUs. Accordingly, there are many more FBI=0 bits than FBI=1, making reception of the former much more statistically likely. This statistical likelihood may be utilized, along with monitoring the channel conditions, to avoid loss of frame boundary synchronization between a transmitter and receiver in the case of a CRC-undetected error in the FBI bit.

In one embodiment, the receiver monitors the quality of the channel during the receipt of each RLC block, and decodes the FBI in the RLC block. The channel quality may be ascertained according to several channel quality metrics, as known in the art. For example, the receiver may monitor the Bit Error Probability (BEP), the Frame Error Rate (FER), the Soft Frame Quality (SFQ), or other channel quality metrics appropriate to a particular implementation. If the channel condition is good—that is, if a channel quality metric exceeds a predetermined threshold—the value of the decoded FBI bit may be relied upon, and the TBF is terminated or not, accordingly.

If the channel condition is bad—that is, if a channel quality metric is below a predetermined threshold—the value of the decoded FBI bit is inspected. If the FBI bit has its statistically unlikely value (i.e., FBI=1), the decoded value is suspect, in light of the poor channel conditions. Rather than rely on the statistically unlikely value and risk prematurely tearing down the TBF, an indication of the decoded TBI value and its RLC block (identified by the Block Sequence Number (BSN) in the RLC header) is stored, and the receiver requests retransmission of the RLC block. FIG. 5 depicts a FBI Set Decision (FSD) table as one form of documentation of the FBI bit decision-making matrix.

Upon receiving the retransmitted RLC block, the channel condition during the retransmission is assessed as discussed above. If the channel condition is good, the value of the retransmitted FBI bit may be relied upon, and the TBF is terminated or not, accordingly. An example of this is entry 2 of the FSD table. The FBI bit received in the RLC block having a BSN of 13 was decoded as FBI=1; however, the channel quality was bad. RLC block 13 was retransmitted, and the FBI=0 was decoded, with good channel quality. The decided FBI value to use is FBI=0, due to the channel quality.

If the channel quality during the retransmission is bad, the decoded value of the retransmitted FBI bit is compared to the value of the stored FBI bit. If the two values match, their common value is relied upon, since the probability of two undetected CRC errors occurring consecutively on the same RLC data is very small. An example of this is entry 1 of the FSD table. The FBI bit received in the RLC block having a BSN of 8 was decoded as FBI=1; however, the channel quality was bad. RLC block 8 was retransmitted, and the FBI bit was again decoded as FBI=1. The decided FBI value is FBI=1, due to the low probability of successive CRC-undetected errors in the FBI bit. Note that in this case, the channel quality during the retransmission is irrelevant, since if it were high, FBI=1 would be relied upon for that reason. Accordingly, one optimization is that if the retransmitted FBI=1, that is the decided FBI value, without assessing the channel condition.

If the value of the retransmitted FBI bit does not match the value of the stored FBI bit, and the channel quality is bad in both cases, one of the bits was decoded erroneously. In this case, the decision of which value to assign to the FBI may be make in two ways. In one embodiment, the statistically likely FBI value is assumed (i.e., FBI=0). In another embodiment, the receiver stores an indication of the value of the retransmitted FBI bit, and issues a second retransmission request for the RLC block. Upon receiving the second retransmitted RLC block, the FBI bit value is decided by a majority vote between the original FBI value and the two retransmitted FBI values. Note that, since this situation is only reached if the first two FBI values disagree, the value of the second retransmitted FBI value will be the outcome of the majority vote, and may be taken as the decided FBI. Since the second retransmitted FBI value would also be relied upon if the channel quality during its transmission were high, there is no need to assess the channel condition during the second retransmitted RLC block.

An example of this is entry 3 of the FSD table. The FBI bit received in RLC block 256 was originally decoded as FBI=1 under bad channel conditions. The retransmitted FBI bit, also received under bad channel conditions, was decoded as FBI=0. A second retransmission of RLC block 256 is requested, and the value of the FBI bit—regardless of channel conditions—will be taken as the decided FBI bit value (since it wins the majority vote under poor channel conditions, or is trusted under good channel conditions). In this manner, the probability of the FBI bit received under poor channel conditions being erroneously decoded to indicate its statistically unlikely value is reduced, at the cost of one, or in the worst case, two, RLC block retransmissions.

Those of skill in the art will recognize that the FSD table of FIG. 5 is a decision matrix for the purpose of explication, and does not represent any data structure or data actually stored in an embodiment. In practice, only a small amount of data need be stored. For each entry, the BSN is necessary to associate a suspect FBI bit with its RLC block. However, since the FBI bit is only stored if decoded as FBI=1 and the channel quality is bad, the entire "$1^{st}$ decode" column will be the same for all entries and is hence redundant. Similarly, under the "$2^{nd}$ decode" column, only the third entry would actually store anything in memory, as the FBI bit is decided in the case of the first two entries upon inspection of the first retransmitted FBI bit (and, for the second entry, the channel quality). Furthermore, a single bit under the "$2^{nd}$ decode" column is sufficient, since a second retransmission request is only made if both FBI=0 and the channel is bad. As used herein, storing an indication of a boundary indicator value is not limited to storing the actual value, but may comprise storing any data sufficient to indicate the value.

Figure 6:
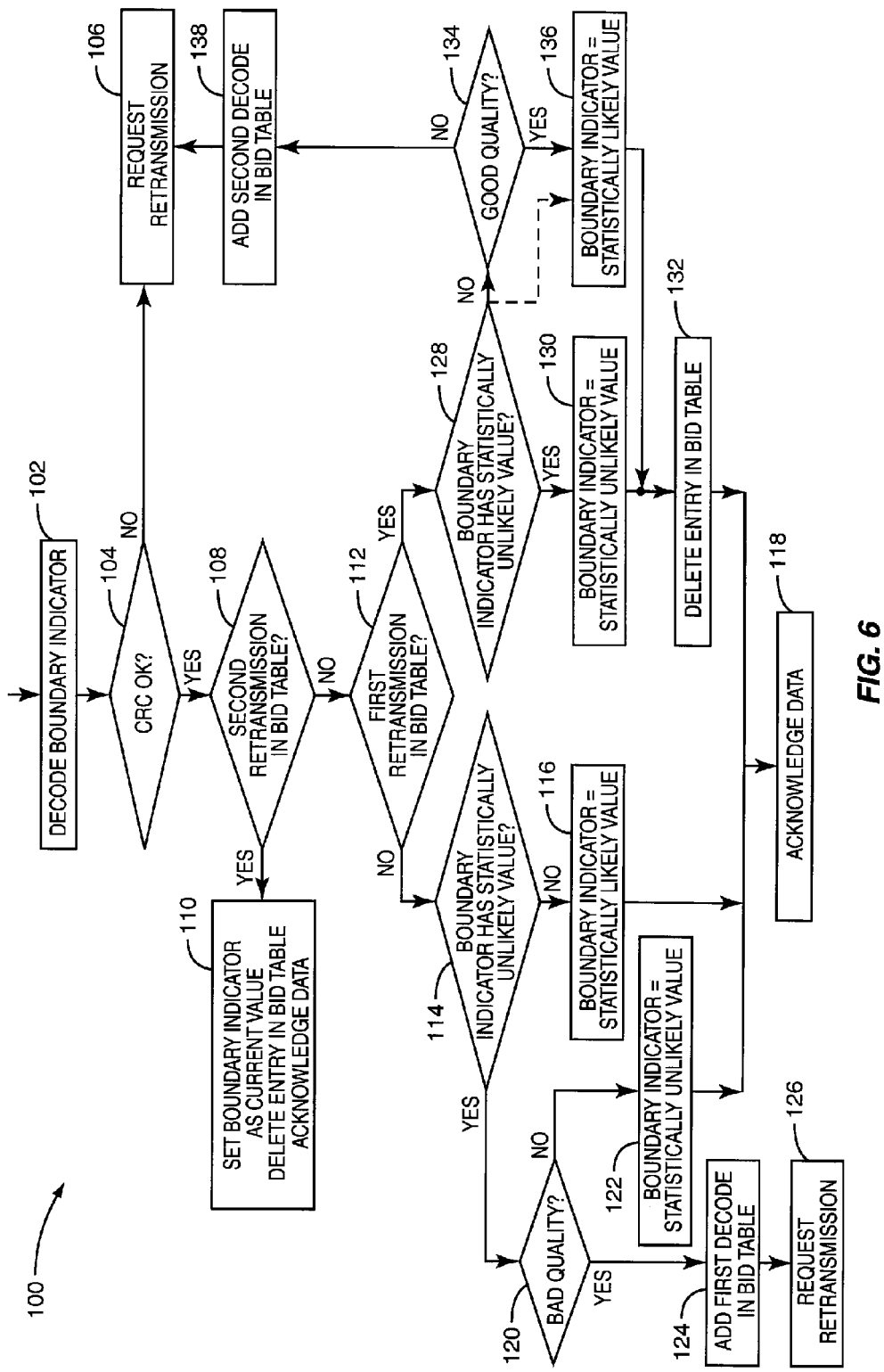
FIG. 6 is a flow diagram of a method of deciding the value of a received boundary indicator.

Of course, the present invention is not limited to FBI bits in RLC blocks encapsulating LLC PDUs of a TBF in EGPRS, as presented above. FIG. 6 depicts a general method 100 for improved boundary synchronization of a higher-level logical data structure, between a transmitter and receiver under poor channel conditions, where a boundary indicator in each of a plurality of lower-level logical data structures encapsulating the higher-level logical data structure has a statistically likely value and a statistically unlikely value. The method 100, which is performed at the receiver, begins by receiving and decoding a boundary indicator (block 102). An error correction check, such as a CRC check, may be performed on a lower-level logical data structure in which the boundary indicator is transmitted (block 104). If the error correction check fails (block 104), the receiver requests a retransmission of the lower-level logical data structure (block 106).

Even if the lower-level logical data structure passes the error correction check (block 104), the boundary indicator may still have been erroneously decoded. A Boundary Indicator Decision (BID) table is referenced to determine if the received boundary indicator is the second retransmission (the third decode) for a particular lower-level logical data structure (block 108). If so, the current value of the boundary indicator is taken as the final decision for the boundary indicator (block 110), since a second retransmission is only requested if the two previous values for the boundary indicator disagree. The corresponding entry in the BID table is deleted, and further processing proceeds, such as acknowledging correct receipt of the lower-level logical structure.

If the current boundary indicator is not the second retransmission (block 108), the BID table is referenced to determine if it is the first retransmitted boundary indicator (block 112). If no entry in the BID table corresponds to the lower-level logical structure (such as by sequence number), it is not a retransmission, and the value of the boundary indicator is inspected (block 114). If the value of the boundary indicator is the statistically likely value, that value is accepted (block 116), and further processing, such as acknowledging correct receipt of the lower-level logical structure, proceeds (block 118).

If the value of the boundary indicator is the statistically unlikely value (block 114), the channel quality is assessed (block 120). If the channel quality is good (i.e., one or more channel quality metrics exceeds a predetermined threshold), the statistically unlikely value is accepted as the proper value for the boundary indicator (block 122), and further processing proceeds (block 118). If the channel quality is bad (i.e., one or more channel quality metrics is below a predetermined threshold) (block 120), an entry is created in the BID table and associated with the lower-level logical structure (such as by sequence number) (block 124), and a retransmission of the boundary indicator (which may comprise a retransmission of the lower-level logical data structure) is requested (block 126).

If the current boundary indicator is the first retransmitted boundary indicator (block 112), the value of the boundary indicator is inspected (block 128). If the value of the boundary indicator is the statistically unlikely value, that value is accepted (block 130) due to either the very small probability of successive undetected errors in the same bit, or good channel conditions during the retransmission. The corresponding entry in the BID table is deleted (block 132), and further processing proceeds (block 118).

If the value of the first retransmitted boundary indicator is its statistically likely value (block 128), the first retransmitted boundary indicator disagrees with the originally decoded boundary indicator (a retransmission would only be requested if the original were statistically unlikely). In one embodiment, the statistically unlikely value is adopted as the proper value for the boundary indicator (block 136), as indicated by the dashed-line path from the "NO" output of block 128. The corresponding BID table entry is deleted (block 132), and further processing proceeds (block 118).

In another embodiment, upon discovering that a first retransmitted boundary indicator has its statistically likely value (block 128), the channel quality during the retransmission is assessed (block 134). If the channel quality is high, its value is accepted (block 136), the BID table entry is deleted (block 132), and further processing proceeds (block 118). If the channel quality is low (block 134), one of the original boundary indicator and the first retransmitted boundary indicator was decoded erroneously, and both were received under poor channel conditions. In this case, an indication of the value of the retransmitted boundary indicator is stored in the BID table (block 138), and a second retransmission is requested (block 106). Upon its receipt, the value of the second retransmitted boundary indicator (i.e., the third decode) will be accepted as the proper boundary indicator (following the path of blocks 102, 104, 108, 110).

In this manner, boundary indicators received under poor channel conditions, that are decoded to their statistically unlikely value, are verified or validated via one or more retransmissions of the boundary indicator (and, if necessary, the lower-level logical structure that contains it). An acceptable value for the boundary indicator is achieved when a retransmitted boundary indicator is received during good channel conditions; when successively boundary indicators received under poor channel conditions are decoded to the same value; or by a majority vote of three successive boundary indicators, all received under poor channel conditions. In any of these cases, the confidence level that the accepted value of the boundary indicator is actually that which was transmitted, is dramatically higher than when a boundary indicator received under poor channel conditions is decoded to its statistically unlikely value. By thus increasing the confidence level in the received boundary indicator, the likelihood of erroneously losing boundary synchronization between a transmitter and receiver with respect to higher-level logical data structures is reduced, while incurring a penalty of only one, or at most, two, retransmissions of a boundary indicator (or a lower-level logical data structure containing the boundary indicator).

The boundary indicator decision method 100 depicted in FIG. 6 may be implemented by specialized software executing on a general-purpose computer or dedicated network processing elements, or by any combination of software, dedicated hardware, firmware, or the like, as known in the computing arts. As used herein a boundary indicator may be a single-bit or multiple-bit value that has at least one statistically unlikely value and at least one statistically likely value. The statistical likelihood of a boundary indicator value is the relative probability of its occurrence with respect to other boundary indicator values during telecommunication transmissions of interest.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of deciding the value of a boundary indicator transmitted from a transmitter to a receiver across a channel having varying quality, the boundary indicator having a statistically likely value or a statistically unlikely value, comprising:

receiving a boundary indicator and decoding the boundary indicator to obtain a first value;

monitoring a channel quality metric;

if the channel quality metric is below a predetermined threshold and the first value is the statistically unlikely value, storing an indication of the first value and requesting a retransmission of the boundary indicator in response to the channel quality metric value and the statistically unlikely first value;

receiving a retransmitted boundary indicator and decoding the boundary indicator to obtain a second value;

if the second value matches the first value, deciding the value of the boundary indicator is the statistically unlikely value; and if the second value differs from the first value, deciding the value of the boundary indicator is the statistically likely value.

2. The method of claim 1 further comprising:

upon decoding the boundary indicator to obtain the second value, monitoring a channel quality metric; and if the channel quality metric is above a predetermined threshold, deciding the value of the boundary indicator is the second value in response to the channel quality metric value.

3. The method of claim 1 further comprising:

upon decoding the boundary indicator to obtain the second value, monitoring a channel quality metric; and if the channel quality metric is below a predetermined threshold, storing an indication of the second value and requesting a retransmission of the boundary indicator in response to the channel quality metric value.

4. The method of claim 3 further comprising:

receiving a boundary indicator and decoding the boundary indicator to obtain a third value; and deciding the value of the boundary indicator is the third value.

5. The method of claim 1 wherein receiving a boundary indicator comprises receiving a lower-level logical data structure containing the boundary indicator.

6. The method of claim 5 wherein the value of the boundary indicator indicates whether or not a higher-level logical data structure encapsulated into a plurality of lower-level logical data structures terminates in the lower-level logical data structure containing the boundary indicator.

7. The method of claim 6 wherein the statistically likely value of the boundary indicator indicates the higher-level logical data structure does not terminate in the lower-level logical data structure containing the boundary indicator.

8. The method of claim 1 wherein the channel quality metric is a Bit Error Probability (BEP).

9. The method of claim 1 wherein the channel quality metric is a Frame Error Rate (FER).

10. The method of claim 1 wherein the channel quality metric is a Soft Frame Quality (SFQ).

11. The method of claim 1 wherein the boundary indicator is a Final Block Indicator (FBI) bit in a Radio Link Control (RLC) layer data block transmitted from a transmitter to a receiver over a radio air interface in an Enhanced General Packet Radio Service (EGPRS) system.

12. The method of claim 1 wherein the FBI bit indicates whether a Temporary Block Flow (TBF) comprising a plurality of Logical Link Control (LLC) Packet Data Units (PDUs) terminates in the RLC block containing the FBI bit.

13. A receiver, comprising:

a receiver operative to receive a boundary indicator having a statistically likely value or a statistically unlikely value over a channel having varying quality and further operative to decode the boundary indicator to obtain a first value;

a controller operative to control the receiver and further operative to monitor at least one channel quality metric; and memory operatively coupled to the controller;

wherein if a channel quality metric is below a predetermined threshold and the first value is the statistically unlikely value, the controller is further operative to store an indication of the first value and direct the receiver to request a retransmission of the boundary indicator in response to the channel quality metric value and the statistically unlikely first value;

receive a retransmitted boundary indicator and decoding the boundary indicator to obtain a second value;

if the second value matches the first value, decide the value of the boundary indicator is the statistically unlikely value; and if the second value differs from the first value, decide the value of the boundary indicator is the statistically likely value.

14. The receiver of claim 13 wherein:

upon decoding the boundary indicator to obtain a second value, if the channel quality metric associated with the second value is above a predetermined threshold, the controller is further operative to decide the value of the boundary indicator is the second value in response to the channel quality metric value.

15. The receiver of claim 13 wherein:

the receiver is further operative to receive a boundary indicator and to decode upon decoding the boundary indicator to obtain a second value, if the channel quality metric associated with the second value is below a predetermined threshold, the controller is further operative to store an indication of the second value and direct the receiver to request a retransmission of the boundary indicator in response to the channel quality metric value.

16. The receiver of claim 15 wherein:

the receiver is further operative to receive a boundary indicator and to decode the boundary indicator to obtain a third value; and the controller is further operative to decide the value of the boundary indicator is the third value.

17. The receiver of claim 13 wherein the channel quality metric is a Bit Error Probability (BEP).

18. The receiver of claim 13 wherein the channel quality metric is a Frame Error Rate (FER).

19. The receiver of claim 13 wherein the channel quality metric is a Soft Frame Quality (SFQ).

* * * * *